3,393,178
ZINC CHELATE AND POLYEPOXIDE COMPOSITIONS CONTAINING IT

John E. Lynch, Emerson, N.J., and Charles A. Kumins, Chappaqua, N.Y., assignors to Interchemical Corporation, New York, N.Y., a corporation of Ohio
No Drawing. Filed Mar. 18, 1965, Ser. No. 440,939
2 Claims. (Cl. 260—47)

This invention relates to a zinc chelate and to polyepoxide compositions containing the chelate, which acts as a delayed action catalyst in the curing of the resins.

Since the reaction between polyepoxides and amine curing agents takes place at room temperature, coating compositions based on the curing of polyepoxides with amines must be supplied as two-package systems. The amine must be kept separate from the resin until time for curing. Commercially available combinations of this type normally have a pot life of about one day.

It has been found that metal chelates can be used as delayed action catalysts for epoxide resins. For instance, the zinc chelate of Example 1 was stable for at least more than a year at room temperature in curable polyepoxide compositions. Such mixtures showed effective curing when heated a few minutes at from about 150° to about 205° C.

Example 1

A zinc chelate was made by mixing (A) a solution of 43.2 g. of orthophenylenediamine in 600 ml. of methylethyl ketone with (B) a solution of 96.0 g. of zinc acetate (2H₂O) in 400 ml. 95% ethyl alcohol, and (C) 800 ml. of methylethyl ketone. The mixture was heated at reflux temperature, about 85° C., while 97.6 g. of salicylaldehyde were slowly added and refluxing was continued for 2 hours. The batch was filtered hot, washed with ethyl alcohol, methylethyl ketone, hot water, again with methylethyl ketone, and dried in the oven overnight at 60° C.

The chelate thus made has the structure

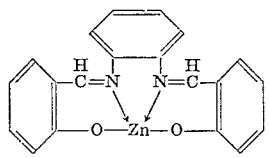

A mixture of 15 parts by weight of this chelate with 85 parts by weight of "Epon 828" showed no evidence of activity when stored at room temperature for 14 months. After this period of time the mixture was used as an adhesive and cured 5 minutes at 177° C. The strength of the bonds formed was of the order of 2350–2800 p.s.i. Similar bonds cured 1 minute at 205° C. were of similar strength. Likewise, bonds made with the same mixture when the latter was newly made were of similar strength.

Example 2.—Protective coating

One roll of a 2-roll mill was heated to 66° C., while the other was cooled with running water to about 16° C. 76 parts by weight of "Epon 1007" were bonded and there were added to the resin 17.7 parts by weight of pure rutile titanium dioxide ("Ti Pure R–610"). 2.3 parts by weight of "Cab-O-Sil" (a finely divided anhydrous silica having a surface area of about 200 square meters per gram and a particle size of 0.15–.020 micron), 2.0 parts by weight of "Butvar B–76" (a polyvinyl butyral), and 2.0 parts by weight of the zinc chelate described in Example 1. Milling was continued for about 15 minutes. The coating was stripped from the mill, allowed to cool, chipped, and pulverized using a "Mikro-Pulverizer" and Dry Ice. The coating was applied at room temperature to 24-gauge steel panels, previously treated with "Bonderite 901," with an electrostatic spray gun and was then cured 30 minutes at a temperature of 150° C. Similarly, aluminum panels pretreated with 0.023 part by weight of "Alodine 200" were also coated.

Such protective coating compositions are preferably made with from 2 to about 20 parts by weight of the zinc chelate defined in claim 1 and from about 98 to about 80 parts by weight of a diglycidyl ether of dihydroxy-diphenylpropane, said ether having an epoxide equivalent ranging from about 175–210 to about 2400–3000 and, correspondingly, having a melting point ranging from about 8–16° C. to about 145–155° C.

When these compositions are applied to a substrate, they may be cured by heating from about 150° C. to about 230° C. for, correspondingly, from about 60 minutes to about 1 minute.

Standard tests were used to evaluate the coatings, such as 5% salt spray 500 hours (ASTM B–117–61), 1 to ½% synthetic detergent 145 hours 165° F. (General Electric test method E50LB11–S1), conical mandrel (ASTM D–522–60), direct and reverse impact (General Electric test method E50LB1351), pencil hardness (General Electric test method E50B11–S5), overbake (30 and 60-minute extensions at 400° F.), food stain (mustard, ketchup, 50% oleic acid under watch glass, room temperature, 192 hours; ASTM D–17308–57), chemical resistance (10% nitric acid, 10% acetic acid, 10% caustic soda solution, under watch glass at room temperature for 85 hours, ASTM D–1308–57), and solvent resistance (toluene, methylethyl ketone under watch glass, room temperature, 85 hours, ASTM D–1308–57).

For comparison, other coatings and tests were similarly made, varying the identity of the catalyst in the compositions. Besides the chelate of this invention, the catalysts thus appraised were melamine, diallylmelamine, paraphenylenediamine, metaphenylenediamine, diaminodiphenylsulfone, trimellitic anhydride, phthalic anhydride, hexahydrophthalic anhydride, boron tetrafluoride monoethylamine complex, benzoguanamine/formaldehyde resin, dodecahydro - 1,4,7,9b - tetrazaphenalene, and benzoguanamine. The result of the evaluation tests were scored on the basis of a scale running from 0 to 100, 100 being the highest possible score. Scores for the various tests were then added up and averaged. The composition of Example 2 had thus an overall rating of 86, while the corresponding compositions catalyzed with the preceding list of catalysts achieved an overall rating of from 60 to 70.

Some examples of polyepoxides that are curable with the chelate of this invention are the diglycidyl ethers of dihydroxydiphenylpropane having epoxide equivalents of from about the range 175–210 to about the range 2400–3000, and, correspondingly, melting points from below room temperature to about 145–155° C. "Epon 828" and "Epon 1007" are of this type, the former having an epoxide equivalent of about 180–195 and a melting point of 8–15° C.; while the latter has an epoxide equivalent of about 1600–1900 and a melting point of 127–133° C. The curing action of the chelate, however, is effective on other epoxide resins and is not limited to the types specifically described above.

In general, the invention applies to polyepoxides that are conventionally known as epoxy resins. Such resins have been defined generically as comprising those materials having more than one vicinal epoxy group, i.e., more than one

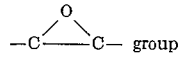 group

These compounds may be saturated or unsaturated, aliphatic, cycloaliphatic, aromatic, or heterocyclic and may be substituted with substituents, such as chlorine, the hydroxyl group, ether radicals, and the like.

Examples of such polyepoxides are given in U.S. Patent 2,633,458.

Other examples of epoxy resins include the epoxidized diglycidyl esters of dibasic acids such as adipic, pimelic, suberic, azelaic, sebacic, maleic, phthalic, terephthalic, isophthalic, etc.

Another group of the epoxy resins includes the epoxidized esters of unsaturated monohydric alcohols and polycarboxylic acids, such as for example di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3 - epoxybutyl) tetrahydro-phthalate, di(4,5 - epoxydodecyl) maleate, di(2,3-epoxybutyl) tetraphthalate, di(2,3-epoxypentyl)thiodipropionate, di(5,6-epoxytetradecyl) diphenyldicarboxylate, di(3,4-epoxyheptyl) sulfonydibutyrate, tri(2,3-epoxybutyl)-1,2,4-butanetricarboxylate, di(5,6-epoxypentadecyl) tetrate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, and di(4,5-epoxyoctadecyl) malonate.

Still another group of the epoxy-resins includes epoxidized derivatives of polyethylenically unsaturated polycarboxylic acids such as, for example, dimethyl-8,9,12,13-diepoxyeicosanedioate, dibutyl - 7,8,11,12 - diepoxyoctadecanedioate, dioctyl-10,11-diethyl-8,9,12,13-diepoxyeicosanedioate, dihexyl - 6,7,10,11-diepoxyhexadecanedioate, didecylcyclohexane - 1,2-dicarboxylate, dicyclohexyl-3,4,5,6-diepoxycyclo hexane-1,2-dicarboxylate, dibenzyl-1,2,4,5-diepoxycyclohexane-1,2-dicarboxylate and diethyl-5,6,10,11-diepoxyoctadecyl succinate.

Still another group comprises the epoxidized polyesters obtained by reacting an unsaturated polyhydric alcohol groups or unsaturated polycarboxylic acid or anhydride groups, such as for example the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers ("Hycar" rubbers), butadiene-styrene copolymers and the like.

Yet another group includes the epoxidized esters of the polyethyleneically unsaturated monocarboxylic acids, such as epoxidized linseed, soybean, perilla, oiticica, tung, walnut, and dehydrated castor oils, methyl linoleate, butyl linoleate, ethyl 9,12-octadecadienoate, butyl 9,12,15-octadecatrienoate, ethyl eleostearate, octyl 9,12-octadecadienoate, monoglycerides of tung oil fatty acids, monoglycerides of soybean, sunflower, rapeseed, hempseed, sardine, and cottonseed oils, and the like.

What is claimed is:

1. A curable epoxide resin composition consisting essentially of (A) from about 2 to about 20 parts by weight of a zinc chelate having the structural formula

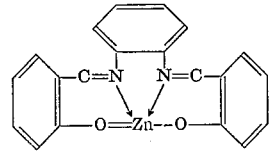

and (B) from about 98 to about 80 parts by weight of a polymeric diglycidyl ether of dihydroxydiphenylpropane, said ether having an epoxide equivalent ranging from about 175–210 to about 2400–3000 and, correspondingly, having a melting point ranging from about 8–16° C. to about 145–155° C.

2. A curable adhesive composition consisting essentially of 15 parts by weight of a zinc chelate having the structural formula

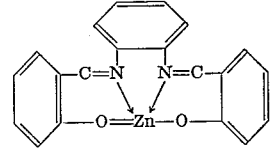

and about 85 parts by weight of a liquid epoxide resin which is a polymeric compound formed by the reaction of epichlorohydrin with dihydroxydiphenylpropane, said resin having a melting point of about 8–16° C. and an epoxide equivalent of about 175–210.

References Cited

UNITED STATES PATENTS 3,272,853  9/1966  Braun _____ 260—2

WILLIAM H. SHORT, *Primary Examiner.*

T. D. KERWIN, *Assistant Examiner.*

UNITED STATES PATENT OFFICE
CERTIFICATE OF CORRECTION

Patent No. 3,393,178

July 16, 1968

John E. Lynch et al.

It is certified that error appears in the above identified patent and that said Letters Patent are hereby corrected as shown below:

Column 1, line 65, "0.15" should read -- .015 --. Column 2, line 26, "17308" should read -- 1308 --; line 41, "result" should read -- results --; line 56, "8-15° C." should read -- 8-16° C. --.

Signed and sealed this 24th day of February 1970.

(SEAL)
Attest:

Edward M. Fletcher, Jr.
Attesting Officer

WILLIAM E. SCHUYLER, JR.
Commissioner of Patents